United States Patent
Courtin

(10) Patent No.: US 9,534,620 B2
(45) Date of Patent: Jan. 3, 2017

(54) FASTENING DEVICE FOR FASTENING A PANEL TO A WALL WITH A HIGH RESISTANCE TO PULLING OFF AND ASSEMBLY COMPRISING SUCH A DEVICE

(71) Applicant: I.T.W. DE FRANCE, Beauchamp (FR)

(72) Inventor: Christian Albert Courtin, Vaureal (FR)

(73) Assignee: I.T.W. DE FRANCE, Beauchamp (FR)

( * ) Notice: Subject to any disclaimer, the term of this patent is extended or adjusted under 35 U.S.C. 154(b) by 334 days.

(21) Appl. No.: 14/350,814

(22) PCT Filed: Oct. 10, 2012

(86) PCT No.: PCT/IB2012/055481
§ 371 (c)(1),
(2) Date: Apr. 10, 2014

(87) PCT Pub. No.: WO2013/054270
PCT Pub. Date: Apr. 18, 2013

(65) Prior Publication Data
US 2014/0255089 A1    Sep. 11, 2014

(30) Foreign Application Priority Data

Oct. 11, 2011    (FR) ...................................... 11 59162

(51) Int. Cl.
*F16B 5/06* (2006.01)
*F16B 21/02* (2006.01)
(Continued)

(52) U.S. Cl.
CPC ............. *F16B 5/0621* (2013.01); *F16B 5/065* (2013.01); *F16B 5/0657* (2013.01); *F16B 5/10* (2013.01);
(Continued)

(58) Field of Classification Search
CPC ....... F16B 5/0621; F16B 5/065; F16B 5/0657; F16B 5/0628; F16B 5/06; F16B 5/10; F16B 21/02; F16B 21/04; F16B 21/07; F16B 21/09
See application file for complete search history.

(56) References Cited

U.S. PATENT DOCUMENTS

| 1,949,027 A | 2/1934 | Pancoe |
| 4,386,949 A | 6/1983 | Bassi |
(Continued)

FOREIGN PATENT DOCUMENTS

| CN | 1550681 A | 12/2004 |
| DE | 9311243 U1 | 9/1993 |
| FR | 2872556 A1 | 1/2006 |

OTHER PUBLICATIONS

ISR for PCT/IB2012/055481 mailed Feb. 12, 2013.
French Search Report for FA 757755 mailed Jun. 27, 2012.

*Primary Examiner* — Daniel Wiley
(74) *Attorney, Agent, or Firm* — Hauptman Ham, LLP

(57) ABSTRACT

This is to fasten a panel to a wall. The device comprises a male member to engage on the panel and a female member to engage on the wall. For its engagement on the periphery of an aperture of the wall having a contour having two crenels facing each other and two circle arcs facing each other and each extending from one to the other of the crenels, the female member comprises a butt enabling the angular position of the female member to be indexed in relation to the wall, in order for an actuating part of the female member to be turned towards an outside edge of the wall. The assembly comprises the fastening device, the wall and the panel. Advantageously, the assembly also comprises a tool capable of insertion between the wall and the panel to reach the actuating part of the female member.

18 Claims, 10 Drawing Sheets

(51) Int. Cl.
  *F16B 5/10*   (2006.01)
  *F16B 21/07*  (2006.01)

(52) U.S. Cl.
  CPC .............. *F16B 21/02* (2013.01); *F16B 21/07* (2013.01); *F16B 5/0664* (2013.01); *F16B 21/073* (2013.01); *Y10T 403/60* (2015.01)

(56) References Cited

U.S. PATENT DOCUMENTS

| | | | |
|---|---|---|---|
| 5,775,859 A * | 7/1998 | Anscher | F16B 5/065 411/344 |
| 5,894,641 A | 4/1999 | Hurtz et al. | |
| 5,970,588 A | 10/1999 | Hurtz et al. | |
| 7,328,489 B2 | 2/2008 | Leverger et al. | |
| 2004/0223826 A1 | 11/2004 | Leon et al. | |

* cited by examiner

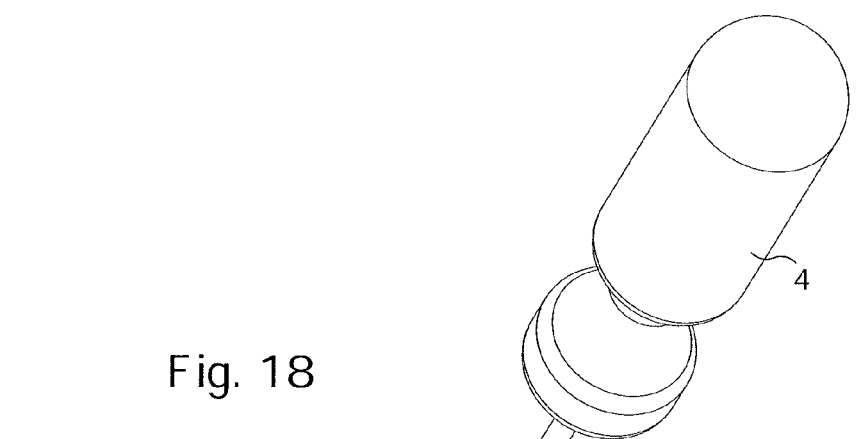
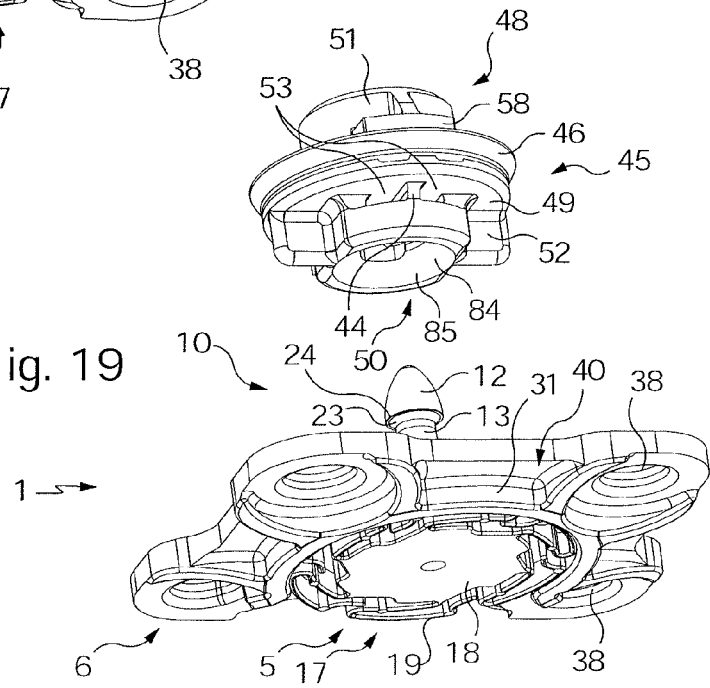

FASTENING DEVICE FOR FASTENING A PANEL TO A WALL WITH A HIGH RESISTANCE TO PULLING OFF AND ASSEMBLY COMPRISING SUCH A DEVICE

RELATED APPLICATIONS

The present application is a National Phase of International Application Number PCT/IB2012/055481 filed Oct. 10, 2012 and claims priority to French Application Number 1159162 filed Oct. 11, 2011.

The invention relates to fastening devices for fastening a panel to a wall with a high resistance to pulling off.

It is known that such a device is for example useful in an automotive vehicle, in case of shock, in order for the panel, for example an inside trim panel of a door, to continue being held by the wall, for example the inside sheet metal of the door, at least in certain critical zones, in particular in the deployment zone of an airbag.

Such a device is already known comprising a lining of plastics material which is engaged on a lateral rim of the wall and a screw which is made to engage with an extension of the panel passing in front of the rim of the wall, the screw being engaged in a bore in the lining.

This device is fully satisfactory, in particular as concerns its performance in resisting pulling off and its capacity to be demounted and remounted, for example to perform an operation on mechanical components situated inside the door.

The invention aims to provide a similar device but which is more discrete visually.

To that end, the invention provides a fastening device for fastening a panel to a wall with a high resistance to pulling off, comprising a male member to engage on the panel and a female member to engage on the wall, the male member and the female member being configured for the female member to be able to receive and retain the male member releasably, characterized in that:

in order for the female member to receive and retain the male member, the male member comprises a foot having a spike which narrows from a shoulder towards the distal end of the foot, while the female member comprises a cavity for reception of said spike and an elastic part extending across the reception cavity which is configured to bend in contact with the spike, on a thrusting-in movement of the foot into the cavity, and to relax when the spike has passed beyond it in order to arrive opposite the shoulder to prevent the withdrawal of the spike;

to release the male member from the female member, the female member comprises an actuating part to dispose the elastic part clear of the shoulder of the foot, the actuating part projecting radially outwards;

for its engagement on the periphery of an aperture of the wall having a contour having two crenels facing each other and two circle arcs facing each other and each extending from one to the other of the crenels, the female member comprises, rearward of the actuating part, a butt having:

an outside lateral surface having at least one first cylindrical portion and a second cylindrical portion diametrically opposite the first cylindrical portion, two bearing skids each jutting radially respectively from said first cylindrical portion and said second cylindrical portion of said outside lateral surface of the butt, each bearing skid having a contact surface for contact with the wall, two insertion fins each projecting radially respectively from said first cylindrical portion and from said second cylindrical portion of said outside lateral surface of the butt, each insertion fin being rearward of and aligned with a respective bearing skid, each insertion fin having, facing the contact surface of the corresponding bearing skid, a contact surface for contact with the wall, each insertion fin having a contour set back from the contour of the corresponding bearing skid, and at least one locking fin projecting radially from said outside lateral surface of the butt between the two insertion fins, having the same contour as one of the insertion fins; and to index the angular position of the female member in relation to the wall, in order for the actuating part of the female member to be turned towards an outside edge of the wall, each insertion fin has a different contour from the contour of the other insertion wing.

To fasten the panel to the wall, once the male member has been engaged on the panel and the female member has been engaged on the wall, it suffices to position the panel with respect to the wall in order for the foot of the male member to be opposite the cavity of the female member and to thrust the foot into the cavity.

Thus, the mounting of the fastening device according to the invention may be carried out blind, with the fastening device not being visible from the outside.

Of course, within the contour of the aperture of the wall on the periphery of which must engaged the female member, the crenels have the same different respective shapes as the insertion fins whereas the circle arcs have the same curvature as the cylindrical portions from which project the insertion fins and from which jut the bearing skids, the thickness of the wall corresponding to the spacing between the contact surfaces of the insertion fins and of the bearing skids which face each other; and to engage the female member on the wall, the butt is angularly oriented in relation to the aperture with each insertion fin having its contour matching up with the crenel of the same shape as the contour of the aperture, then the back of the butt is thrust into the aperture until the bearing skids come to bear on the wall and then the female member is turned until the locking fin is accommodated in the corresponding portion of the aperture delimited by the crenel of the same shape.

Because the actuating part is turned towards an outside edge of the wall, that actuating part can be accessed from that outside edge to free the male member from the female member and thus free the panel from the wall.

Thus, although the mounting of the fastening device is carried out blind, it is possible to act on that fastening device to free the male member from the female member.

According to features preferred for reasons of simplicity, convenience and economy of implementation:

said butt has two said locking fins each projecting radially from said outside lateral surface, each said locking fin having the same contour as a respective one of said insertion fins;

the angular spacing between each locking fin and the insertion fin having the same contour is a quarter turn;

said elastic part is an extractible pin, said actuating part of the female member being formed by a loop of said pin;

said pin comprises two legs linked to each other by said loop;

said pin is made of elastically flexible metal wire shaped by bending with said legs being disposed flanking each other;

each leg has an arcuate portion the inside radius of curvature of which corresponds to the inside diameter of said shoulder, each said arcuate portion being disposed in said reception cavity;

said female member comprises, in addition to said butt, a brim surrounding the mouth of said cavity;

said butt comprises a flange from which projects said brim;

said male member comprises:
a clip comprising said foot and a head; and
a sole provided to be engaged on said panel, said sole and said head being configured to be assembled with the head kept in a predetermined position relative to the sole with the exception of an elastic offset about said predetermined position;

said sole comprises a base in which is formed a cut-out while a rib surrounding said cut-out projects from a first face of said base; in that said head comprises a plate, a counter-plate and a spacer linking the plate to the counter-plate, the counter-plate comprising flexible peripheral arms; and in that in the assembled state of said sole and of said head, said spacer, is disposed in said cut-out with the counter-plate facing said first face of said base with said flexible arms in contact with said rib while said plate faces a second face of said base, which is a reverse face to said first face; and/or said counter-plate comprises a rigid flange on the periphery of which are regularly spaced said flexible arms, which each comprise a first branch and a second branch with an elbow between the first branch and the second branch, the first branch extending between a zone of junction with the flange and the elbow, the second branch extending between the elbow and an appendix, which appendix extends towards a neighboring flexible arm with its free end situated between the flange and the elbow of said neighboring flexible arm.

According to a second aspect, the invention also concerns an assembly comprising a device as set out above, a wall comprising an aperture on the periphery of which is engaged the butt of said female member and a panel on which is engaged said male member, said actuating part of said female member being turned towards an outside edge of the wall.

According to features that are preferred as being particularly simple and convenient to enable the panel to be freed from the wall, the assembly further comprises a tool configured to act on said actuating part in order to dispose the elastic part clear of the shoulder of the foot, said female member and said foot being configured in order for the foot to be able to thrust into said cavity until said panel bears against said wall and be able to withdraw as far as a position in which said shoulder is against said elastic part with said panel then being sufficiently spaced away from said wall for said tool to be inserted between said wall and said panel to come into engagement with said actuating part.

In an preferred embodiment in which the present invention is particularly useful, said wall is an inside metal sheet of an automotive vehicle door whereas said panel is an inside trim panel of said door.

The disclosure of the invention will now be continued with the detailed description of an embodiment, given below by way of illustrative and non-limiting example, with reference to the accompanying drawings, in which:

FIGS. 17 to 19 are perspective views illustrating the actions to accomplish in order to free the male member from the sleeve.

Figure 1:
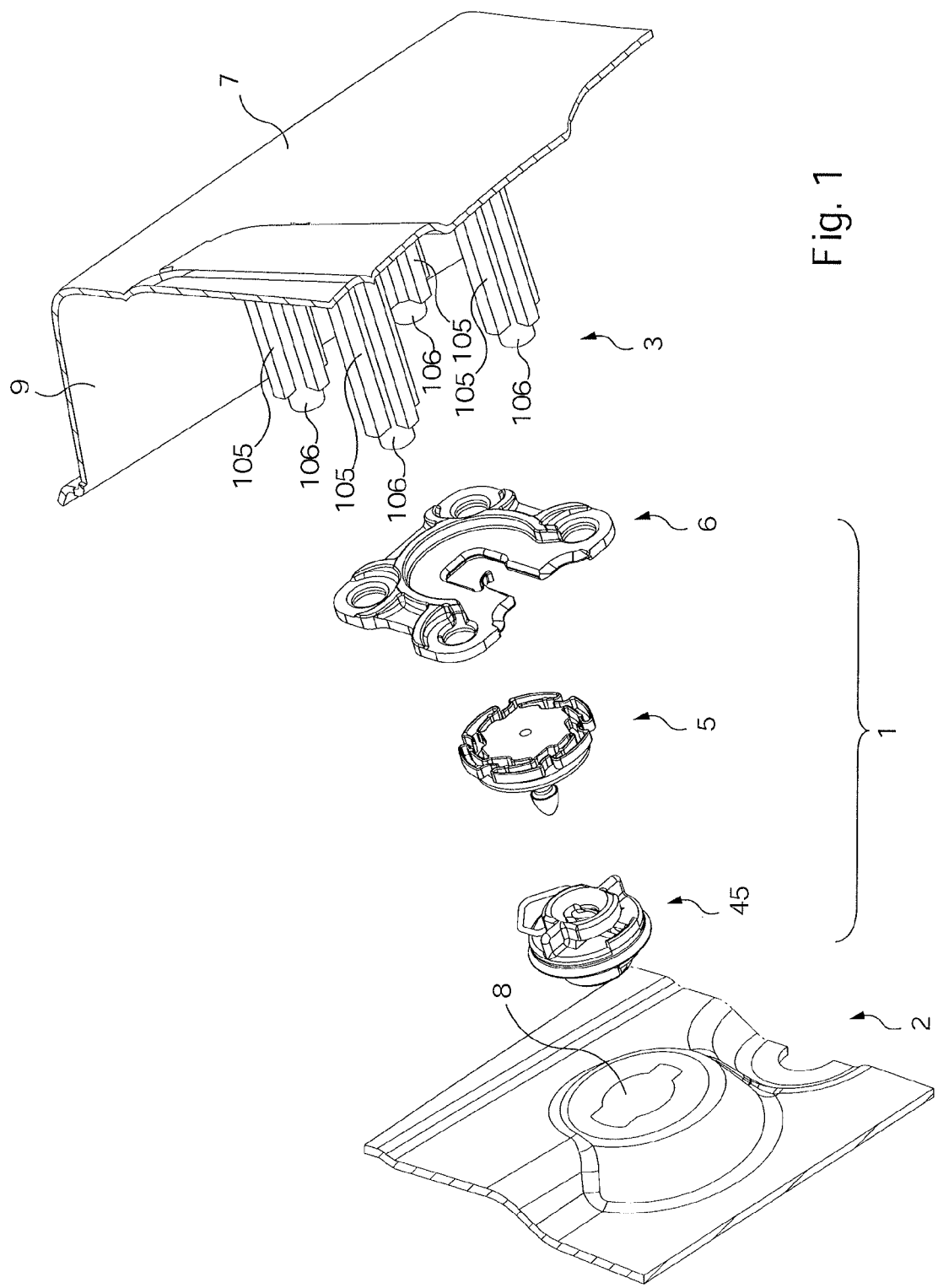
FIG. 1 is an exploded perspective view of a fastening device according to the invention, of a panel and of a wall to fasten to each other using that fastening device, the wall and the panel being represented partially.
Figure 2:
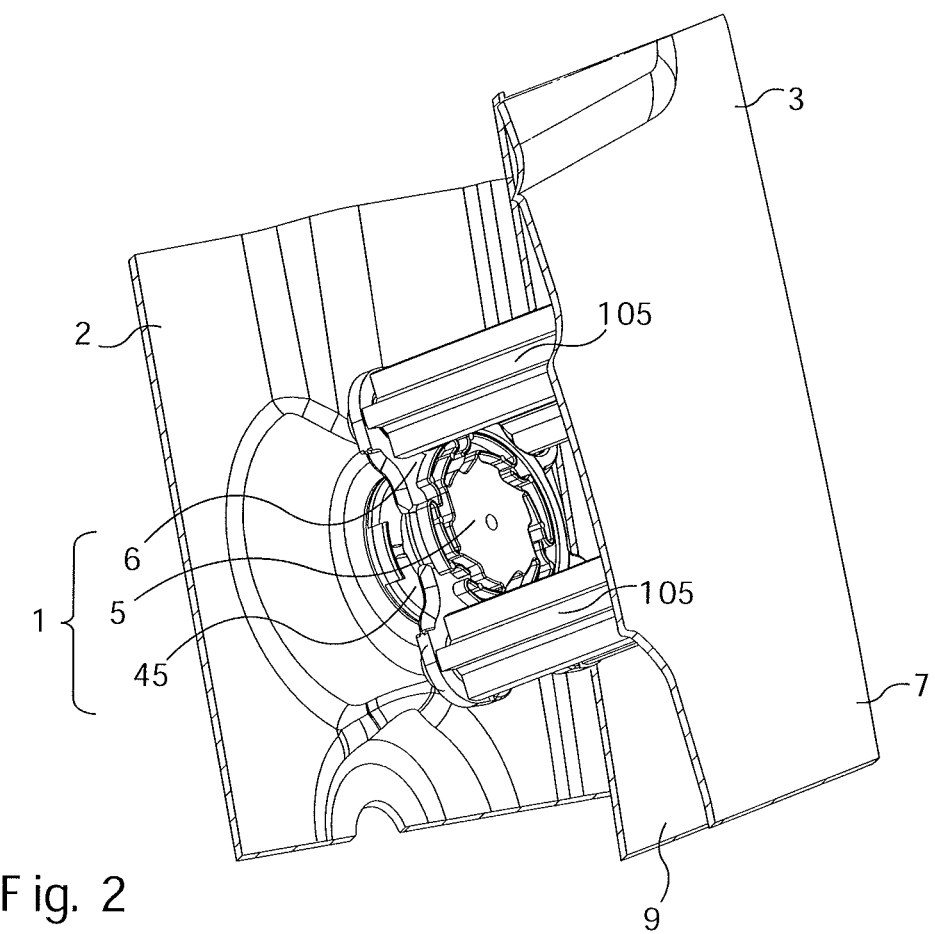
FIG. 2 is a view of the parts illustrated in FIG. 1 in the assembled state.

As can be seen more particularly in FIGS. 1 and 2, the fastening device 1 illustrated comprises a clip 5, a sole 6 and a sleeve 45.

In general terms, when these three parts are in the assembled state, they are aligned, that is to say centered on the same axial direction.

The sole 6 is provided to be engaged on a panel 3. The clip 5 is provided to be assembled with the sole 6. The sleeve 45 is provided to be engaged on the periphery of an aperture 8 of a wall 2. The sleeve 45 is provided to receive and retain the clip 5 in order for the panel 3 and the wall 2 to be fastened to each other.

Here, the wall 2 is the inside metal sheet of an automotive vehicle door and the panel 3 is an inside trim panel of that door.

Figure 3:
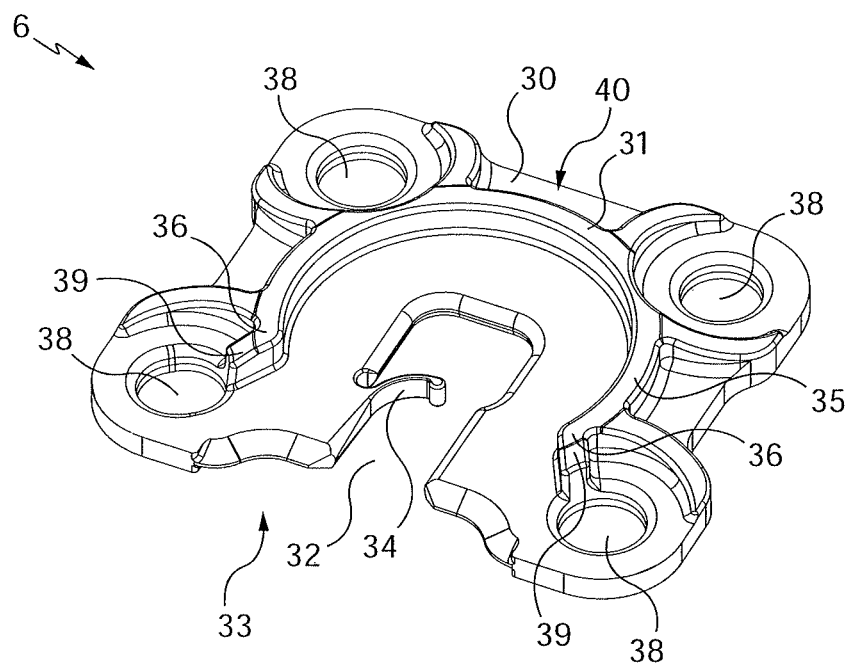
FIGS. 3 and 4 are in perspective views from different angles of a sole of that fastening device.
Figure 4:
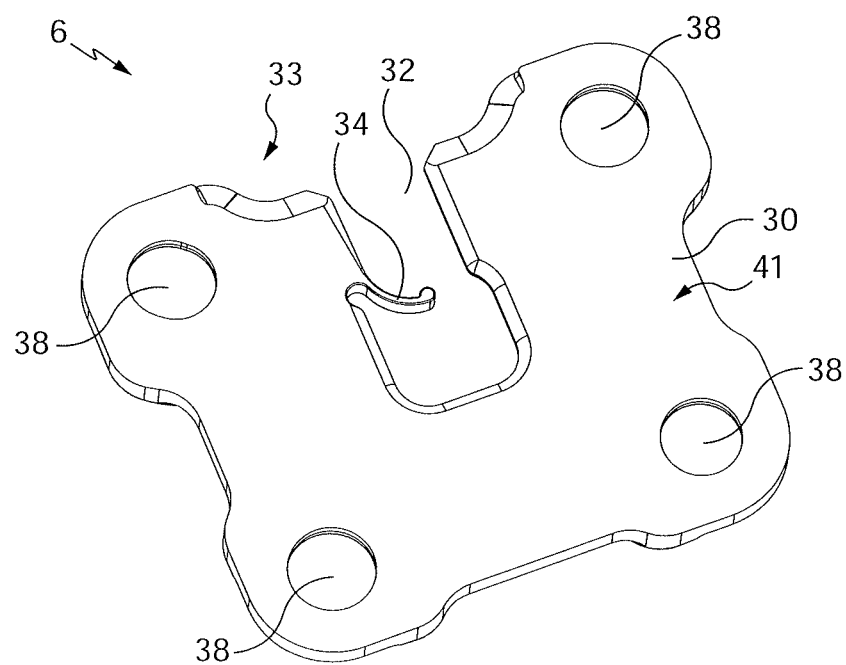

The sole 6 (FIGS. 3 and 4) is of plastics material molded in a single piece. It comprises a flat base 30 and a rib 31.

A cut-out 32 is formed in the base 30. The cut-out 32 extends from a central region of the base 30 to an edge 33. A flexible tongue 34 projects into the cut-out 32 from one of its longitudinal edges. The tongue 34 is inclined towards the central region of the base 30 and towards the longitudinal edge of the cut-out 32 opposite to the edge from which extends the tongue 34.

The flat base 30 has a front face 40 and a back face 41 which are opposite faces to each other. The rib 31 projects from the font face 40.

The rib 31 is oriented in the same general direction as the cut-out 32.

The rib 31 comprises two end portions 39 and a central portion 35 extending from one to the other of the end portions 39. The central portion 35 is of an arcuate form longer than a half-circle, concentric with the base 30. Each end portion 39 is inclined towards the other end portion 39 and towards the central portion 35. Thus, the separation between the end portions 39 decreases towards the central portion 35, with each side of the rib 31 having a point of inflexion at each junction 36 between the central portion 35 and an end portion 39. The base 30 has four apertures 38 regularly distributed in the vicinity of the periphery of the base 30, externally of the rib 31.

The clip 5 (FIGS. 5 and 6) is of plastics material molded in a single piece. It comprises a foot 10 and a head 11.

The head 11 comprises a plate 15, a counter-plate 17 and a spacer 16 linking the plate 15 to the counter-plate 17.

The counter-plate 17 comprises a rigid flange 18 and six flexible arms 19. The flange 18 and the arms 19 are of the same thickness.

The flange 18 has a generally circular outline. The six arms 19 are regularly distributed around the periphery of the flange 18.

The arms 19 will now be described when they are at rest, that is to say in the absence of external stress (position illustrated).

Figure 5:
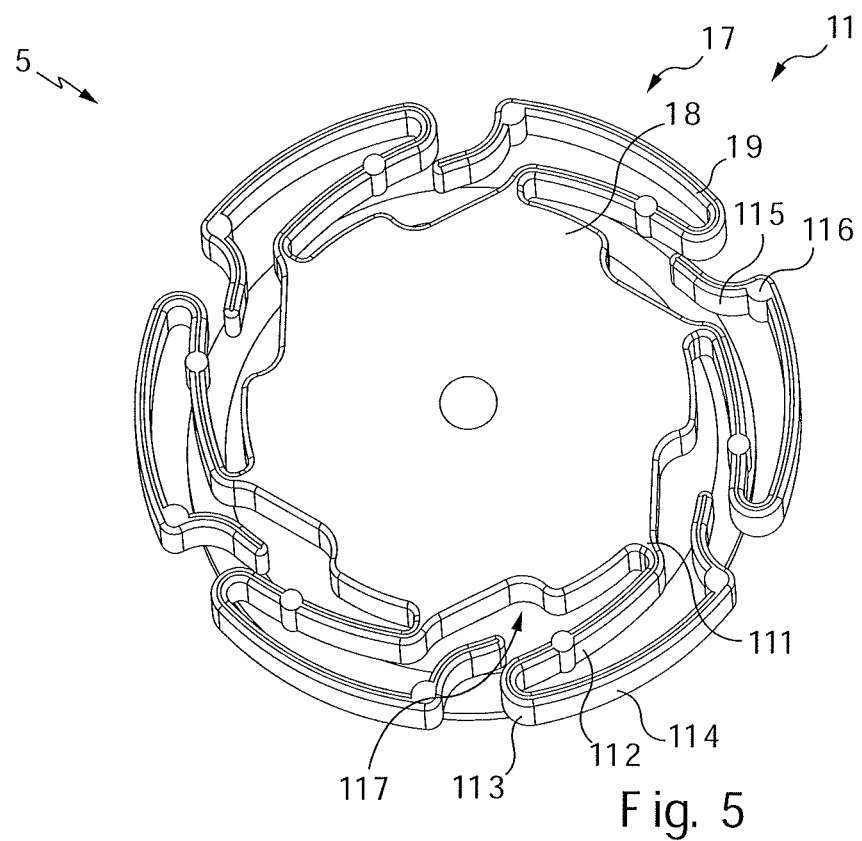
FIG. 5 is a perspective view showing the front of a clip of that fastening device.
Figure 6:
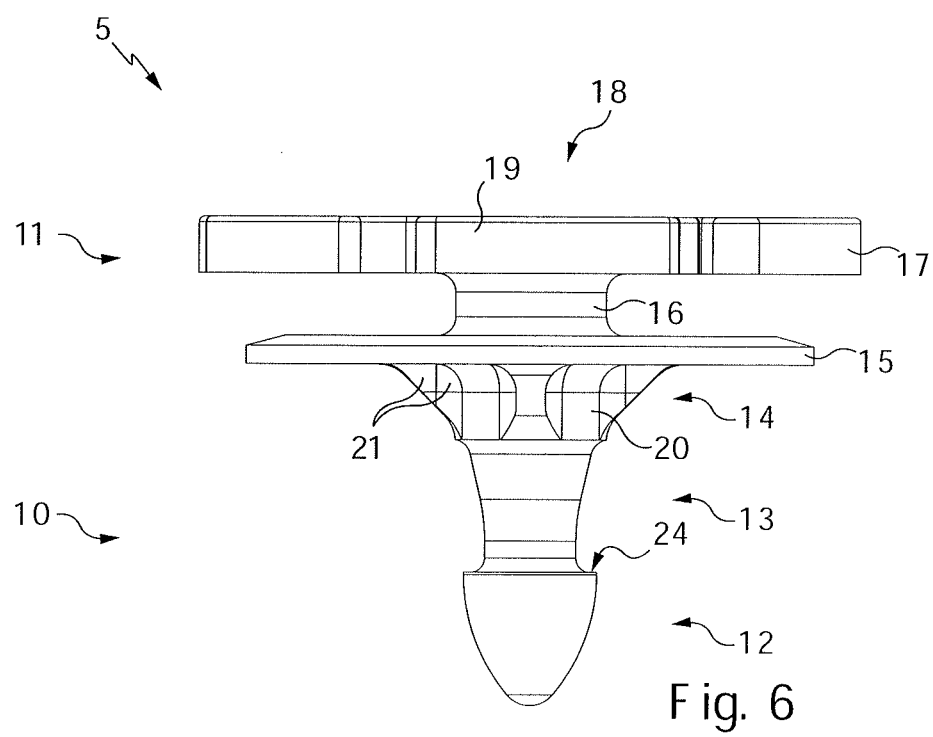
FIG. 6 is a view in elevation of that clip.

Each arm 19 is of hair pin shape: it comprises two branches 112 and 114, an elbow 113 and an appendix 115. The branch 112, as seen in FIG. 5, extends clockwise, from a region 111 of junction with the flange 18. The bend 113 forms a U-turn between the branches 112 and 114. The branch 114 extends to an end 116 situated facing the junction region 111. Both branches 112 and 114 are slightly curved with a convex outside surface. The branch 114 is slightly longer than the branch 112. The appendix 115 is connected to the end 116. The appendix 115 extends towards the neighboring arm 19. It is curved with its convexity turned towards the junction region 111 of the arm 19 to which it belongs. The free end of the appendix 115 is located between the elbow 113 of the neighboring arm 19 and the edge of the flange 18.

If a force directed towards the flange 18 is applied to one of the arms 19, that arm 19 may bend elastically as it moves towards the flange 18.

A recess 117 is provided on the flange 18 facing each appendix 115. Each recess 117 is provided to accommodate the facing appendix 115 when the arm 19 borne by that appendix 115 is bent towards the flange 18.

The branches 114 of the six arms 19 are oriented along the same circle which is concentric with the flange 18.

It will be noted that the appendix 115 enables each arm 19 to have a distal portion which is spaced from the periphery of the counter-plate 17. This makes it possible, when a set of clips 5 is placed loose in a container, to avoid the different clips 5 hooking to each other by the arms 19.

The spacer 16 extends longitudinally from one face of the flange 18 to a face of the plate 15.

The foot 10 comprises a spike 12, a stem 13 and a base portion 14.

The base portion 14 is connected to the plate 15 on the face that is remote from the spacer 16. The base portion 14 takes the form of a barrel 20 around which are disposed four reinforcing ribs 21 in a cross.

The stem 13 connects the base portion 14 to the spike 12. Here, the widest part of the stem 13 is located adjacent the base portion 14.

Here the spike 12 has the shape of an ogive narrowing from a shoulder 24 towards the distal end of the foot 10.

The clip 5 is adapted to be assembled with the sole 6, the counter-plate 17 coming to be accommodated in the space delimited by the front face 40 and by the central portion 35 of the rib 31, the spacer 16 coming to be accommodated in the cut-out 32 and the plate 15 coming against the back face 41.

The diameter of the inside surface of the central part 35 of the rib 31 corresponds to the diameter of the outside surfaces of the branches 114 when the arms 19 are at rest (not bent).

Thus, when the arms 19 are at rest, the head 11, and more generally the clip 5, is centered in relation to the central part 35 of the rib 31 and consequently in relation to the base 30 of the sole 6.

The assembly of the clip 5 with the sole 6 is made by placing the spacer 16 in face-to-face relationship with the mouth of the cut-out 32 through the edge 33 with the back face of the counter-plate 17 facing the front face 40 of the base 30 and the front face of the plate 15 facing the back face 41 of the base 30; then the spacer 16 is made to slide into the cut-out 32, the spacer 16 encounters the tongue 34, which bends to enable the spacer 16 to advance then relaxes when the spacer 16 has passed beyond it. At the same time, the counter-plate 17, and more generally the arms 19 situated at its periphery, come to meet the end portions 39 of the rib 31, which forces the arms 19 to come into contact with the portions 39 to bend to pass beyond the point of inflexion 36, after which the arms 19 relax.

The clip 5 and the sole 6 are then in the assembled state illustrated in FIGS. 2 and 13 to 19.

Due to the fact that the central portion 35 of the rib 31 is longer than a half-circle, the counter-plate 17 is retained by the central portion 35 of the rib 31. The withdrawal of the clip 5 is also prevented by the tongue 34.

The fact that, in its portion situated between its bottom and the tongue 34, the cut-out 32 is wider than the diameter of the spacer 16 whereas the spacing between the tongue 34 and the bottom of the cut-out 32 is greater than the diameter of the spacer 16, associated with the flexibility of the arms 19, enables the clip 5, simultaneously, to assume a position that is centered relative to the sole 6 in the absence of external force and, in case of a force oriented transversely to the foot 10 of the clip 5, to assume an off-centered position relative to the sole 6. The maximum off-centeredness corresponds to arms 19 concerned coming into abutment against the flange 18. Here the maximum off-centeredness is of the order of 2 mm.

Due to the fact that the back face of the counter-plate 17 bears, in particular by its flange 18, on the front face 40 of the base 30 whereas the front face of the plate 15 bears against the back face 41 of the base 30, the clip 5 becomes off-centered by moving thus relative to the sole 6 parallel to the base 30 and thus parallel to the plate 15 and to the counter-plate 17.

It will be noted that the fact that the arms 19 are free in relation to each other enables the arms 19 to bend individually and thus to deform as well as possible to continue to conform to the central part 35 of the rib 31 when the deformations take place.

As the areas of contact between the flange 18 and the plate 15 with the base 30 are relatively large, relatively high forces may be exerted between the clip 5 and the sole 6 in the axial direction of the clip 5, without causing degradation.

The flaring of the stem 13 of the foot 10 is also favorable for the resistance to pulling off.

Here, flaring of the stem 13 is such that the widest part is located adjacent the base portion 14. As a variant, the widest part is situated adjacent the shoulder 24.

The panel 3 comprises a front portion 7 and a rim 9 which frames the front portion 7.

When the panel 3 is fastened to the wall 2 (FIG. 2), the front portion 7 of the panel 3 is away from the wall 2 whereas the edge of the rim 9 that is remote from the front wall 7 is against or in immediate proximity to the wall 2.

The engagement on the wall 3 of the male member, formed by the clip 5 and by the sole 6 assembled together, is achieved here thanks to the securing arms 105 of the panel 3.

Here, there are four securing arms 105. They project rearward from the front portion 7. At its distal end each securing arm 105 initially has a finger 106 whose cross-section corresponds to the contour of the apertures 38 of the sole 6, each finger 106 emerging from a wider portion of the arm 105, such that there is a shoulder at the base of each finger 106, each finger 106 being longer than the thickness of the base 30 of the sole 6, the fingers 106 being disposed in relation to each other in the same way as the apertures 38 of the sole 6.

To engage the sole 6 on the wall 3, the sole 6 is disposed facing the wall 3 as shown in FIG. 1, that is to say with the front face 40 of the base 30 facing towards the securing arms 105. Each finger 106 is engaged in a respective aperture 38, by continuing the thrusting-in movement until the sole 6 comes into abutment against the shoulders situated at the base of the fingers 106.

The portion of the fingers 106 emerging beyond the sole 6 is then subjected to head-forming to terminate the securing of the sole 6 to the panel 3.

Figure 13:
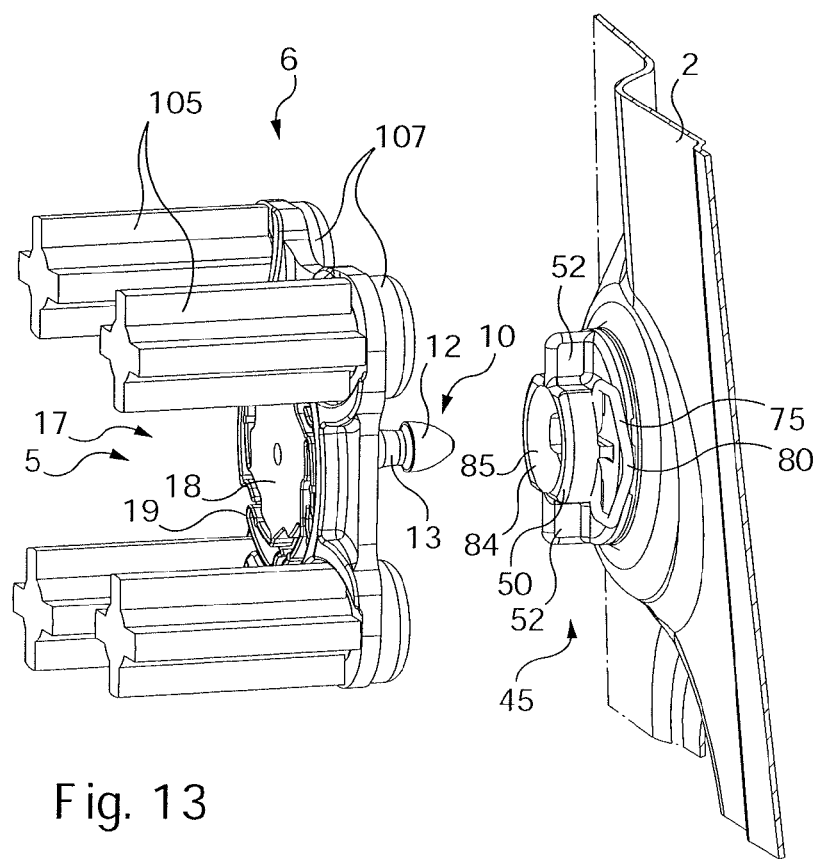
FIG. 13 is a perspective view showing the sleeve engaged on the wall, a male member formed by the clip and by the sole assembled together as well as securing arms of the panel illustrated in FIGS. 1 and 2, the male member being secured to the panel by engagement on the securing arms, the clip facing the sleeve.
Figure 14:
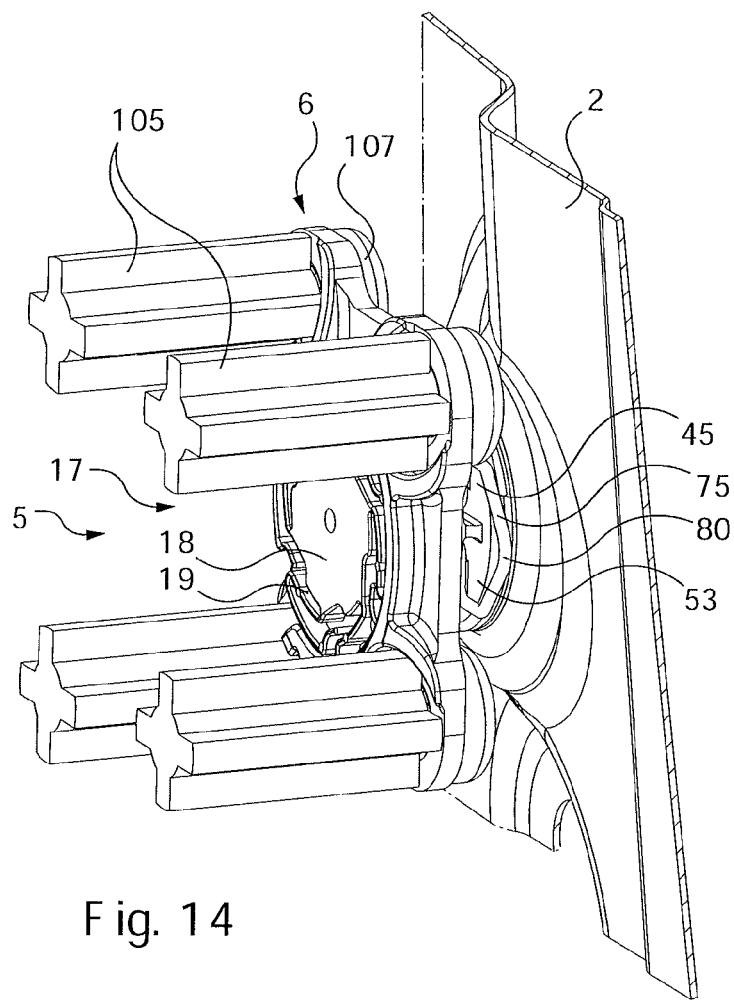
FIG. 14 is a similar view to FIG. 13 but with the fastening device in the assembled state and thus the panel fastened to the wall.
Figure 15:
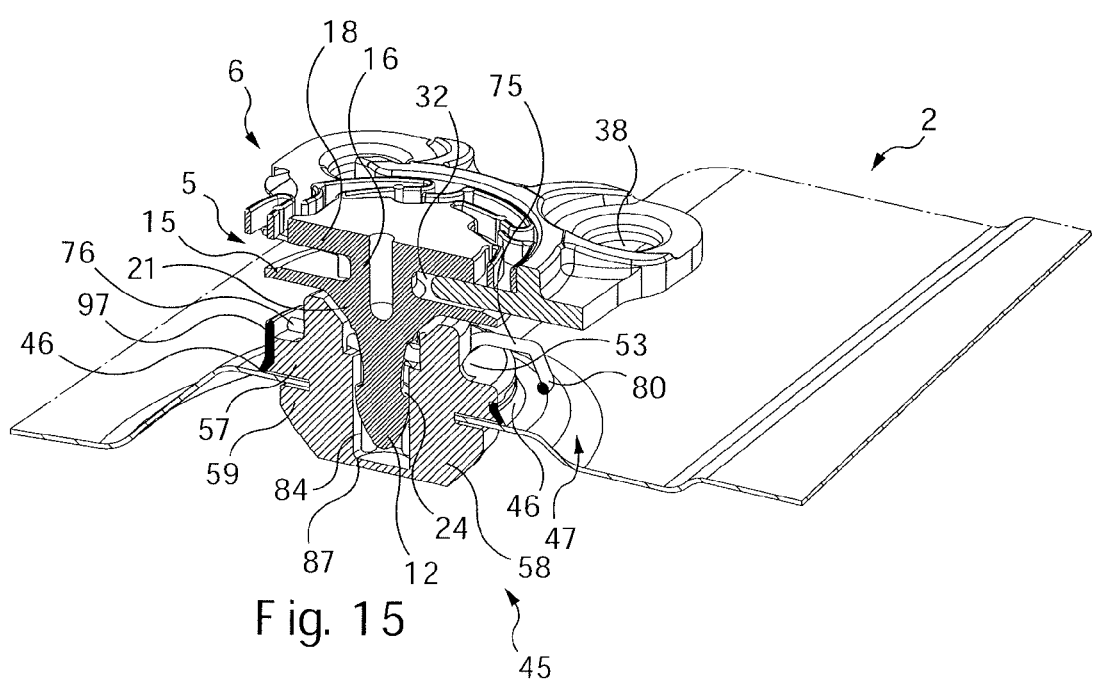
FIG. 15 is a perspective view of the fastening device engaged on the wall, shown partly torn away, the panel not being shown in order not to clutter the drawing.

The head-formed portions of the fingers 106 form retaining heads 107 (FIGS. 13 and 14).

It will be noted that such an assembly between the sole 6 and the panel 3 is particularly resistant to the pulling-off forces which may exist between the sole 6 and the panel 3.

According to circumstances, the sole 6 is engaged on the panel 3 before or after assembly with the clip 5.

When the male member is assembled and engaged on the panel 3, the foot 10 projects from the sole 6 on the opposite side to the front portion 7.

The sleeve 45 (FIGS. 7 to 11) comprises a body 48 and a pin 47.

The body 48 comprises a butt 51, a brim 50 and lugs 52.

The butt 51 comprises a flange 49 having a front face from which project the brim 50 and the lugs 52.

The brim 50 is formed by a generally annular wall. The brim 50 is disposed concentrically in relation to the flange 49, and more generally concentrically in relation to the butt 5. The lugs 52 are disposed on respective opposite sides of the brim 50, extending here in the same diametrical direction, from the outside lateral surface of the brim 50 to the periphery of the flange 49.

More specifically, the outside lateral surface of the brim 50 has two opposite flats, each lug 52 projecting radially from one of the flats.

In general terms, the brim 50 surrounds the mouth of a cavity 84 of the body 48 to receive the foot 10 of the clip 5.

Beyond the mouth delimited by the brim 50, the cavity 84 continues rearward in the butt 51.

More specifically, rearward of the brim 50, the cavity 84 is surrounded by the flange 49 then by a wall 56 of the butt 51 rearward of the flange 49.

At the back, the cavity 84 is closed by a transverse back wall 87 of the butt 51.

The inside lateral surface 85 of the brim 50 that surrounds the mouth towards the front of the cavity 84, is frusto-conical narrowing rearward.

Between the brim 50 and the back wall 87, the surface that laterally delimits the cavity 84 is of circular cross-section of slightly greater diameter than the outside contour of the shoulder 24 of the foot 10. Here, this surface is provided with gadroons adapted to fit the greatest diameter of the spike 12. As a variant, that surface is smooth.

The butt 51 serves to engage the sleeve 45, and more specifically the body 48 of the sleeve 45, on the wall 2, by virtue of the shape it has externally rearward of the flange 49, and more specifically projecting from the rear face of the flange 49 and from the outside lateral surface 88 of a barrel 73.

Here, the barrel 73 is formed by a wall which surrounds the wall 56, to which it is connected by radially oriented ribs 72. As a variant, the wall 56 forms the barrel 73, for example by being thicker.

The outside lateral surface 88 of the barrel 73 is of circular cross-section here with two diametrically opposite cylindrical portions 89 and 90.

Two bearing skids 57 project radially from respectively the first portion 89 and from the second portion 90.

The bearing skids 57 extend widthwise from a first lateral surface 131 to a second lateral surface 132.

Here, the bearing skids 57 also project from the back face of the flange 49. The width of each bearing skid 57 is slightly less than the diameter of the surface 88. The skids 57 each have a surface 60 of contact with the wall 2, on the opposite side to the flange 49.

Figure 8:
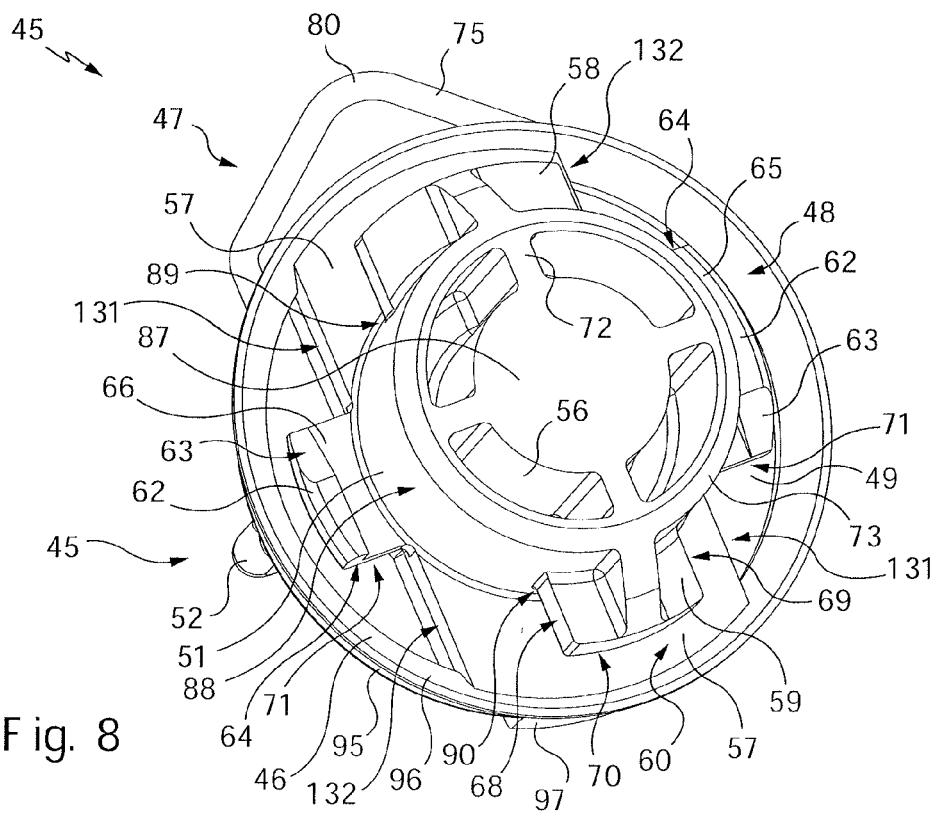
Figure 10:
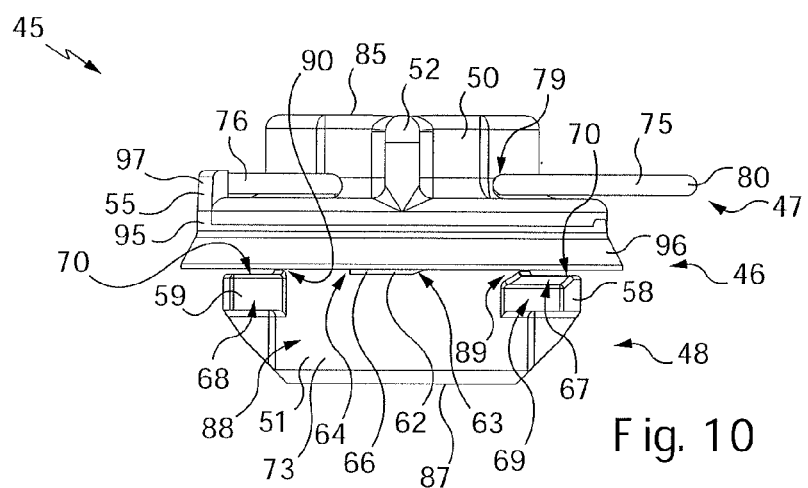
FIGS. 10 and 11 are elevation views of that sleeve, respectively from the left side and from the top of FIG. 9.
Figure 11:
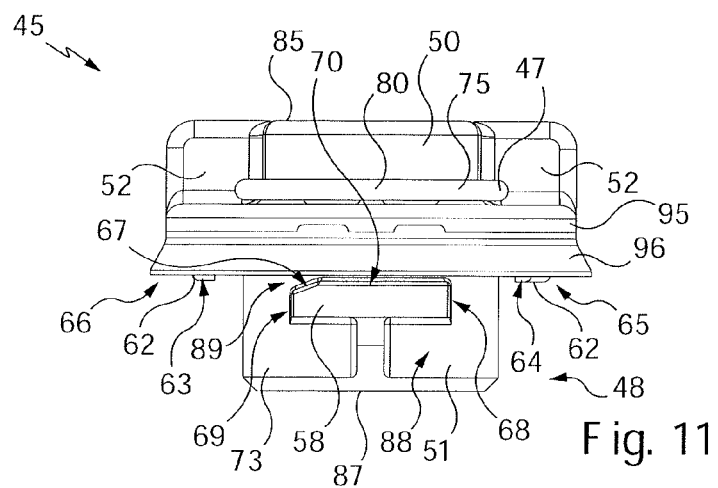

As can be seen in FIGS. 8 and 10, two insertion fins 58 and 59 project radially respectively from the first cylindrical portion 89 and from the second cylindrical portion 90, each with a surface 70 of contact with the wall 2 facing a respective bearing skid 57. Each insertion fin 58 or 59 is thus rearward of and aligned with a respective bearing skid 57. Each insertion fin 58 and 59 extends widthwise from a first lateral surface 68 to a second lateral surface 69 which is parallel to and of smaller height than the first lateral surface 68. Each first lateral surface 68 is transverse to the corresponding contact surface 70 and for each fin 58 and 59 an inclined surface 67 extends from the contact surface 70 to the second lateral surface 69.

The spacing between the contact surfaces 60 of the bearing skids 57 and the contact surfaces 70 of the insertion fins 58 and 59, corresponds to the thickness of the wall 2.

As is explained below, each insertion fin 58 and 59 is of different predetermined width (distance between the first lateral surface 68 and the second lateral surface 69).

The insertion fin 58 is wider than the insertion fin 59. They are both of smaller width than the width of the bearing skids 57, that is to say that each insertion fin 58 and 59 has a contour that is set back from the contour of the corresponding bearing skid 57.

Here, the insertion fin 58 and the insertion fin 59 are of the same length (dimension in the radial direction); and the length of the insertion fin 58 and of the insertion fin 59 is less than the length of the bearing skids 57.

Two opposite locking fins 65 and 66 project radially from the outside lateral surface 88 of the butt 51. They extend radially transversely to the bearing skids 57 and to the insertion fins 58 and 59. The fins 65 and 66 are of smaller thickness than that of the bearing skids 57.

Figure 16:
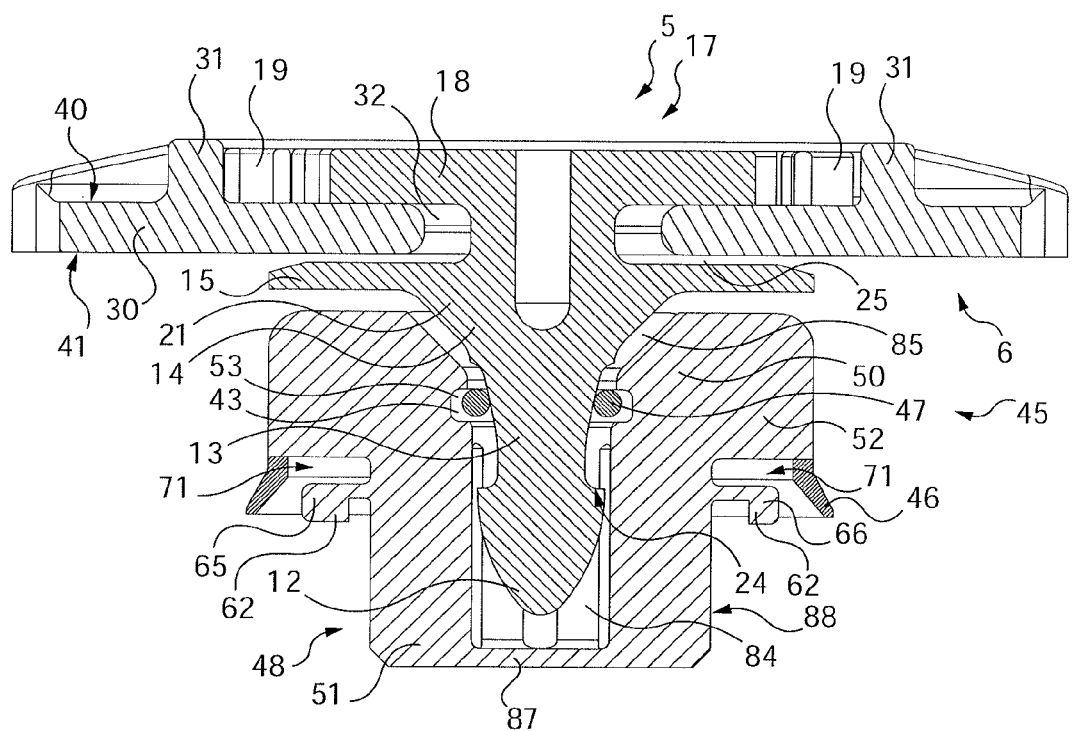
FIG. 16 is a cross-section view in elevation of the fastening device in the assembled state.

The locking fins 65 and 66 are each separated from the flange 49 by a space 71 (FIGS. 8 and 16). A rim 62 projects from the distal end of each fin 65 and 66. Each rim 62 has an inclined surface 63 at the junction between its back edge and one of its lateral edges. The other lateral edge forms a locking surface 64.

The locking fin 65 has the same contour as the insertion fin 58 and the locking fin 66 has the same contour as the insertion fin 59. Considered from behind the sleeve 45 (as in FIG. 9), each insertion fin 58 and 59 is followed, in the clockwise direction, respectively by the locking fin 65 and by the locking fin 66 having the same contour.

As can be seen especially in FIGS. 7 and 19, the brim 50 is traversed by two pairs of openings 53 which enable the body 48 to receive the pin 47, as is explained later.

The two pairs of openings 53 are diametrically opposite and are each situated half way between the lugs 52.

Here, each opening 53 is of rectangular cross-section one of the long sides of which is flush with the front face of the flange 49, one of the short sides of which is flush with the bottom of a groove 43 (FIG. 16) situated set back in relation to the surface 85, and of which the other short side is flush with a partition 44 for separation with the neighboring opening 53.

The partition 44 situated between the two openings 53 of one of the pairs and the partition 44 situated between the two openings 53 of the other pair are aligned in the same diametric direction.

On each side of the partitions 44, the facing openings 53 are aligned. The butt 51, the brim 50 and the lugs 52 of the body 48 are of relatively rigid plastics material molded in one piece. In addition to that part of relatively rigid plastics material, the body 48 comprises a skirt 46 of relatively flexible plastics material, molded over the edge 54 of the flange 49.

The skirt 46 has a ring 95 added onto the edge 54. A frusto-conical collar 96 is unitary with the ring 95 and extends widening rearward.

A tab 97 integral with the skirt 46 projects forward facing one of the pairs of openings 53.

To avoid the tab 97 projecting beyond the ring 95, the periphery of the flange 49 has a recess 55 in which is accommodated a bridging member linking the tab 97 to the ring 95 of the skirt 46.

The pin 47 is made of elastically flexible metal wire shaped by bending.

As can be seen more particularly in FIG. 18, the pin 47 comprises two legs 76 and a loop 75 linking the legs 76 to each other. The legs 76 are disposed flanking each other, with each leg 76 having a form which is the mirror image of the form of the other leg 76.

Each leg 76 has an arcuate portion 77 the inside radius of curvature of which corresponds to the inside diameter of the shoulder 24.

Between the arcuate portion 77 and the distal end 81, each leg 76 has a portion 78 inclined outwardly and towards the distal end 81 then a straight portion oriented in the longitudinal direction.

Between the arcuate portion 77 and the loop 75, each leg 76 comprises a portion 82 inclined outwardly and towards the loop 75.

It will be noted that the spacing between the legs 76 decreases from the loop 75 towards the arcuate portions 77 and that it increases from the arcuate portions 77 towards the distal ends 81.

The loop 75 comprises an arch 80 and two transversely oriented straight portions 79, each portion 79 extending between one of the ends of the arch 80 and the proximal end of one of the legs 76, in this case the end of the inclined portion 82 that is the opposite end to the arcuate portion 77.

Here, the arch 80 has the general shape of a V.

The straight portions 79 are aligned with each other.

Figure 7:
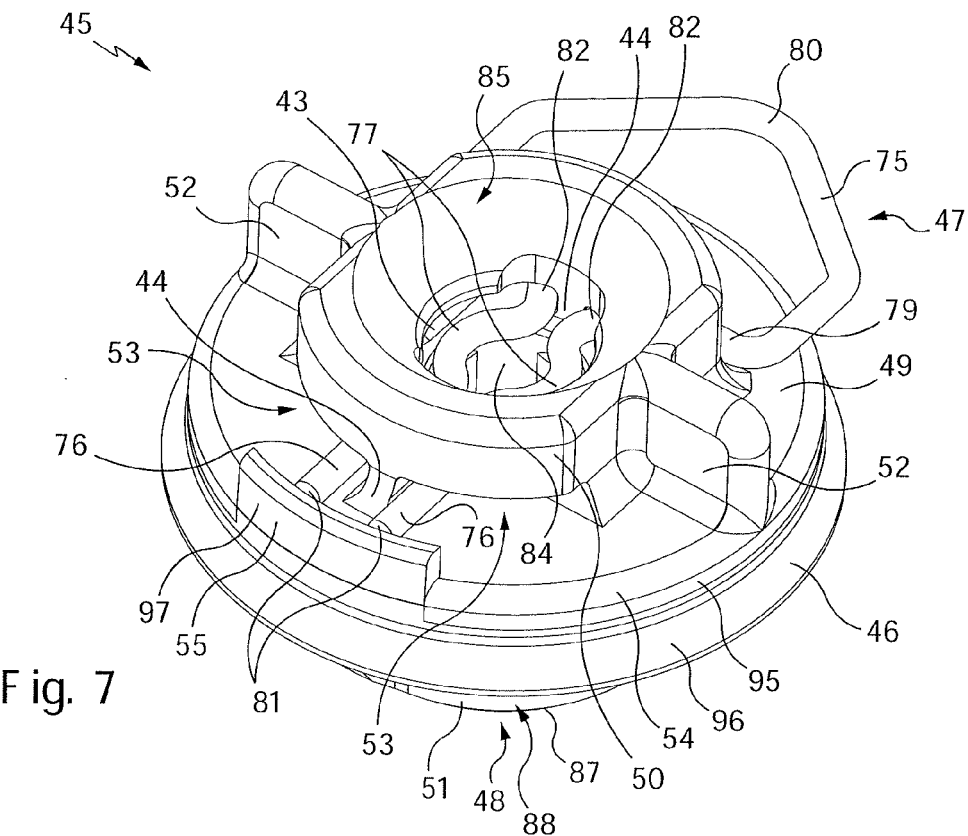
FIGS. 7 and 8 are perspective views respectively showing the front and the rear of a sleeve of that fastening device, which sleeve forms the female member of that fastening device.

As can be seen more particularly in FIG. 7, in the assemble state of the sleeve 45 (pin 47 mounted on the body 48), the arcuate portions 77 extend through the reception cavity 84, the inclined portions 78 and 82 are accommodated in the openings 53, the legs 76 emerge from the brim 50 with the distal ends 81 facing the tab 97 and the loop 75 is adjacent the opposite external side of the brim 50 to the tab 97, with the arch 80 projecting beyond the flange 49.

The partition 44 is sandwiched between the inclined portions 82.

The effect of the elasticity of the metal material from which the pin 47 is made and of the inclination of the portions 82 is that the pin 47 is biased in relation to the body 48 in the direction in which it thrusts into it.

The transversely oriented straight portions 79 form a stop for thrusting in the pin 47.

On the side of the tab 97, the partition 44 is sandwiched between the inclined portions 78, in order to wedge the pin 47 effectively in relation to the body 48.

The mounting of the pin 47 on the body 48 is carried out by inserting each leg 76 into one of the openings 53 situated on the opposite side to the tab 97. During the thrusting-in movement, the legs 76 encounter the partition 44, the pin 47 deforms elastically with the legs 76 spreading then coming together again when the inclined portions 78 have passed beyond the partition 44, the movement continuing until the straight portions 79 come into abutment against the brim 50.

Figure 17:
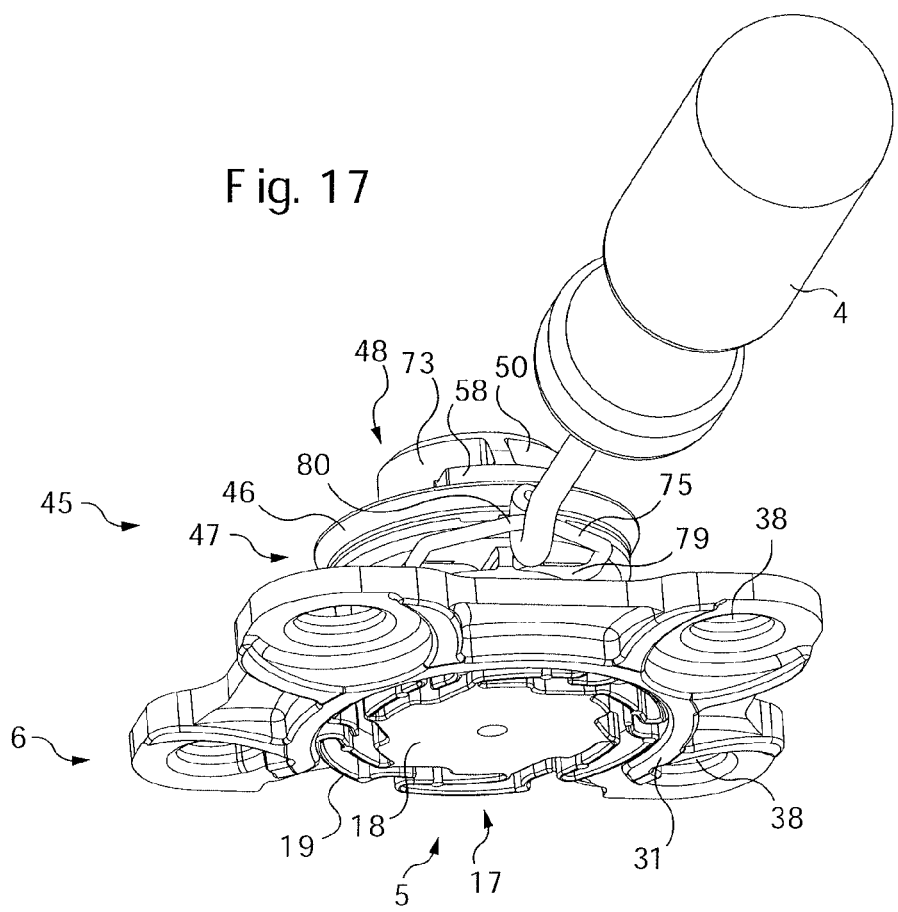

The extraction of the pin 47 from the body 48 is carried out by pulling on the pin 47, for example as illustrated in FIGS. 17 and 18, by virtue of a hook 4 engaged in the arch 80.

When the pin 47 is in place in the body 48, the presence of the grooves 43 which are formed set back from the surface 85 (see especially FIG. 16) enables the legs 76 to spread apart from each other if they are subjected to a corresponding force. The elasticity of the pin 47 tends to make the legs 76 return towards each other to resume their initial position.

Figure 9:
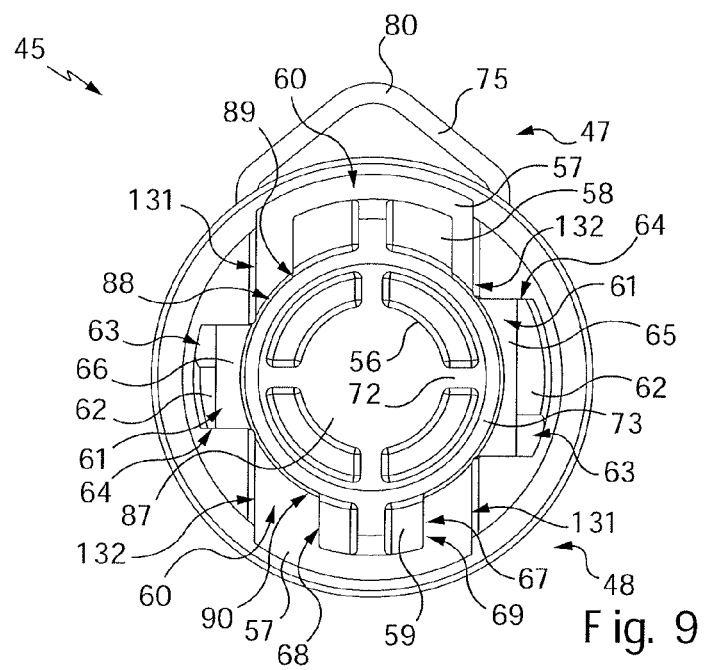
FIG. 9 is a plan view showing the back of that sleeve.

As can be seen especially in FIGS. 8 and 9, the angular orientation of the loop 75 is the same as the angular orientation of the insertion fin 58.

As explained below, the difference in outline between the insertion fins 58 and 59 enables angular indexing of the loop 75 to be implemented. It is thus important to ensure that the loop 75 is oriented like the insertion fin 58, that is to say to avoid the opposite orientation (loop 75 angularly oriented like the insertion fin 59).

The tab 97 avoids it being possible to insert the pin 47 into the body 48 with the opposite orientation, that is to say in which the arch 80 would have the same angular orientation as the insertion fin 59.

Figure 12:
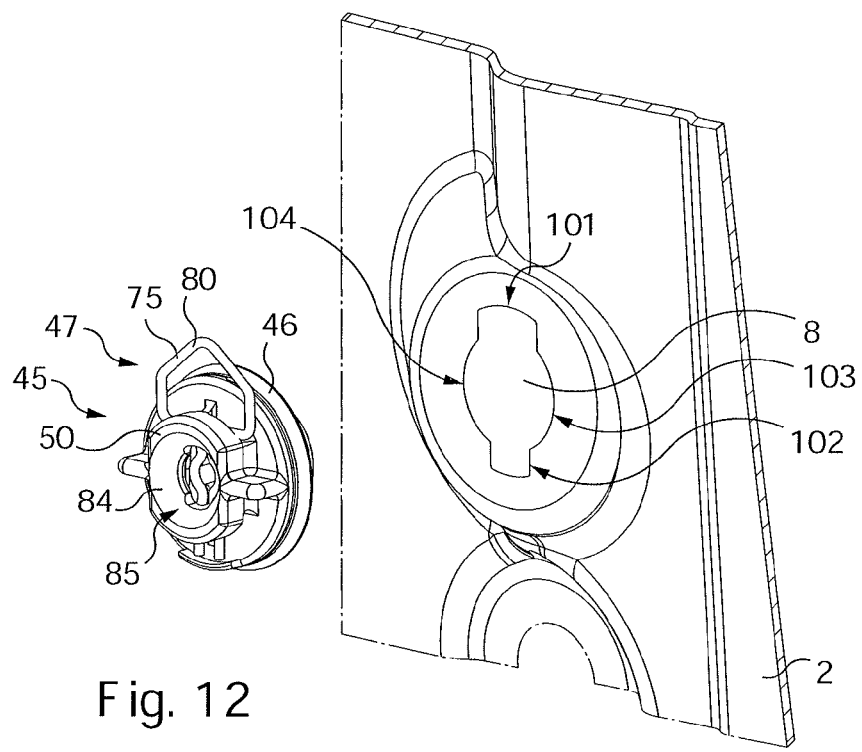
FIG. 12 is a perspective view of that sleeve and of a portion of the wall illustrated in FIGS. 1 and 2, with the sleeve oriented to be mounted by engagement on the periphery of an aperture of that wall.

As can be seen especially in FIG. 12, the aperture 8 of the wall 2 has a contour having two crenels 101 and 102 facing each other and two circle arcs 103 and 104 facing each other, with the circle arcs 103 and 104 each extending from an end of the crenel 101 to an end of the crenel 102.

The contour of the circle arcs 103 and 104 corresponds to the contour of the cylindrical portions 89 and 90, with the same radius and same center. The crenel 101 corresponds to the contour of the insertion fin 58. The crenel 102 corresponds to the contour of the insertion fin 59.

Thus, the insertion fins 58 and 59 can only pass through the aperture 8 if the surface 88 is centered on the circle arcs 103 and 104 and if the insertion fins 58 and 59 are angularly oriented like the crenels 101 and 102.

In FIG. 12, the sleeve 45 is illustrated with the angular orientation that enables the insertion fins 58 and 59 to pass through the aperture 8.

The mounting of the butt 51 on the periphery of the aperture 8 of the wall 2 is carried out by inserting thus through the aperture 8 the portion of the butt 51 situated rearward of the bearing skids 57, until the contact surfaces 60 of the bearing skids 57 and the edges 62 of the locking fins 65 and 66 come against the wall 2, on the periphery of the aperture 8.

It should be noted that in this position, the insertion fins 58 and 59 have not fully passed through the aperture 8: the inclined surfaces 67 and the front of the lateral surfaces 68 face the material of the wall 2.

On account of the inclination of the surfaces 67 and of the straight character of the front of the surfaces 68, it is possible to rotate the sleeve 45 clockwise only, that is to say in the usual screwing direction. The rotational movement of the sleeve 45 in relation to the wall 2 is guided by cooperation between the cylindrical portions 89 and 90 of the butt 51 and the material of the wall 2 situated along the circle arc portions 103 and 104.

The lugs 52 enable an assembly operator or robot to turn the sleeve 45 in relation to the wall 2. The inclined surfaces 67 serve as ramps which ensure that, during the rotational movement, the wall 2 will locate between the insertion fin 58 and the bearing skid 57 facing it, and between the insertion fin 59 and the bearing skid 57 facing it. The inclined surfaces 63 of the locking fins 65 and 66 also serve as a ramp, to make the locking fins 65 and 66 bend forward.

When the sleeve 45 has completed a quarter turn, the locking fin 65 faces the space delimited by the crenel 101 and the locking fin 66 faces the space delimited by the crenel 102. The locking fins 65 and 66 may then relax and enter those spaces. On account of this entry, it is no longer possible to turn the sleeve 45 relative to the wall 2 in either direction. The mounting of the sleeve 45 on the wall 2 is then terminated, since the sleeve 45 is then prevented from moving relative to the wall 2 whether with regard to the thrusting-in and the pulling off (the wall 2 is sandwiched between the skids 57 and the fins 58 and 59) or with regard to rotation (on account of the engagement of the locking fins 65 and 66 in the aperture 8).

When the sleeve 45 is mounted on the wall 2, the insertion fins 58 and 59 project relatively greatly beyond the contour of the aperture 8, and more specifically beyond the circle arcs 103 and 104.

The area of the wall 2 on which a force for extraction of the butt 51 is exerted is consequently relatively great. This enables the wall 2 to resist relatively high extraction forces exerted on the sleeve 45, without deforming.

When the sleeve 45 is mounted on the wall 2, the skirt 46 provides airtightness and watertightness between the wall 2 and the flange 49. As the butt 51 is fully closed towards the back, in particular with the back wall 87, the sleeve 45 obturates the aperture 8 in a manner that is airtight and watertight.

If it is desired to demount the sleeve 45 from the wall 2, it is possible to do this by raising the locking fins 65 and 66, for example with the end of a flat screwdriver engaged under the inclined surfaces 63 and then by turning the sleeve 45 relative to the wall 2 anticlockwise until the contour of the insertion feet 58 and 59 corresponds to that of the crenels 101 and 102. When the sleeve 45 is in that angular position, it may be extracted from the wall 2.

It will be noted that in the mounted position of the sleeve 45, the arch 80 of the pin 47 is turned towards the outside edge of the wall 2.

As explained below, this makes it possible to reach the arch 80 from that outside edge, with a tool such as a hook 4 to extract the pin 45 from the body 48.

After having engaged the sleeve 45 on the periphery of the aperture 8 of the wall 2 as explained above and after having engaged the male member formed by the clip 5 assembled with the sole 6 engaged on the securing arms 105 by head-forming of the fingers 106 as explained above, it is possible to proceed with the fastening of the panel 3 on the wall 2, the male member formed by the clip 5 assembled with the sole 6 being positioned in relation to the sleeve 45 as shown in FIG. 13, that is to say with the spike 12 of the foot 10 directed towards the cavity 84.

The panel 3 is then pushed towards the wall 2, the spike 12 comes into contact with the arcuate portions 77 of the legs 76 of the pin 47, either directly, or by being guided by the surface 85. In contact with the head 12, the pin 47 deforms elastically with the legs 76 which spread apart then, when the spike 12 has passed beyond the arcuate portions 77, the legs 76 clamp onto the stem 13.

The withdrawal of the foot 10 from the cavity 84 is prevented by the shoulder 24 coming into contact with the arcuate portions 77.

It should be noted that the possibility for the clip 5 to move in relation to the sole 6 by virtue of the bending of the arms 19 enables the foot 10 to align itself with the cavity 84 including when the sole 6 is slightly offset in relation to the aperture 8 and thus in relation to the sleeve 45.

This possibility of mutual centering between the foot 10 and the cavity 84 enables the fastening device 1 to be compatible with relatively high positioning tolerances, in particular tolerances of the order of magnitude that is encountered between the inside sheet metal wall of an automotive vehicle door and the inside trim panel which is made to cover that wall.

It will be noted that this possibility of mutual centering between the foot 10 and the cavity 84 is particularly useful here where the engagement of the foot 10 in the cavity 84 is performed blind, the wall 3 completely masking the female member constituted by the sleeve 45 and the male member constituted by the clip 5 and the sole 6.

As can be seen especially in FIG. 16, the cavity 84 is configured in order for the foot 10 to be fully inserted therein, whereas the stem 13 is relatively long, such that when the foot 10 is fully inserted into the cavity 84, the shoulder 24 is relatively far from the pin 47.

Consequently, between the position in which the foot 10 is fully inserted into the cavity 84 and the position in which it is no longer possible to remove the foot 10 from the cavity 84 (pin 47 in abutment on the shoulder 24), the panel 3 may move a relatively large distance away from the wall 2.

Here, this distance is of the order of 4 mm.

Here, the fastening device 1 is a safety component positioned at a predetermined location to avoid the panel 3 separating from the wall 2 under the effect of a shock. Such a location is for example situated on the deployment path of an airbag.

Here, the fastening device 1 is capable of resisting a pulling-off force greater than 100 daN.

To keep the panel 3 pressed against the wall 2, a plurality of conventional snap-engagement fastening clips are provided (not visible in the drawings), which have moderate resistance to pulling-off, since such clips must enable the demounting of the panel from the wall 2.

The above-mentioned possibility of moving the panel 3 away from the wall 2 before the shoulder 24 comes against the pin 47 serves to enable the clip 5 to be freed from the sleeve 45 to enable the complete demounting of the panel 3.

Thus, when such demounting must be carried out, the conventional clips which serve to keep the panel 3 pressed against the wall 2 are released and the panel 3 is moved apart from the wall 2 as much as possible.

The spacing that then exists between the wall 2 and the panel 3 enables a tool such as the hook 4 illustrated in FIGS. 17 and 18 to be inserted between the wall 2 and the panel 3 from the outside edge towards which the loop 75 is turned, to engage that tool with the arch 80 and enable the pin 47 to be pulled upon to extract it from the sleeve 45, as shown in FIG. 18.

Once the pin 47 has been removed, there is no longer any obstacle to the removal of the foot 10 from the cavity 84 and consequently the panel may be entirely removed from the wall 2.

When the panel 3 has been fully removed, the body 48 is accessible and it is possible to put the pin 47 back in place as explained above.

The sleeve 45 is then ready to receive the foot 10 again to again fasten the panel 3 to the wall 2.

It will be noted that in the illustrated example, the loop 75 forms an actuating part to dispose the elastic part constituted by the pin 47 clear of the shoulder 24 of the foot 10.

In a variant not illustrated, the pin 47 is replaced by one or more different members, for example a slide of which the actuating part is an external pusher as described in U.S. Pat. No. 5,894,641 or a pair of two slides of which the actuating parts are diametrically opposite external pushers, as described in U.S. Pat. No. 5,970,588.

In another variant not illustrated, the butt is shaped differently, for example with a single locking fin; and/or the outside lateral surface is not cylindrical (for example it is a flat) between the cylindrical portions such as 89 and 90.

In another variant not illustrated, the parts of the body 48 situated forward of the flange 49 are configured differentially, with for example the lugs 52 being eliminated and the rotation of the sleeve 45 being actuated via a key engaged on the opposite flats of the brim.

In another variant not illustrated, the bearing skids 57 projecting both from the outside lateral surface 88 of the barrel 73 and from the back face of the flange 49, are replaced by bearing skids which jut but which do not project from the surface 88 (with for example a space between the bearing skids and the surface 88), and/or do not project from the back face of the flange 49 (with for example the bearing skids being fins projecting from the surface 88 or which are flush with the back face of the flange 49).

In another variant not illustrated, the number of flexible arms comprised by the clip is different from six, for example five or seven, and/or the flexible arms do not include any appendix but are connected together by a rim in the form of a circular ring on their periphery.

In another variant not illustrated, the sole has a plateau set back in relation to the base. A wall, which is open on one side connects the plateau to the base such that the clip is mounted on the plateau and not on the base.

In other variants not illustrated, the female member and the male member are different, with for example the capability of centering between the cavity and the foot being provided by the female member rather than by the male member; or even no centering capability is provided; or else the relatively long travel of the foot of the male member in the cavity of the female member to be able to separate the panel from the wall is eliminated, by providing for example a lateral aperture in the panel to be able to access the actuating part of the elastic part of the female member.

In other variants not illustrated, the wall on which the female member is engaged and the panel on which the male member is engaged are different from the inside sheet metal of an automotive vehicle door and from an inside trim panel of an automotive vehicle door, for example a part of the outside sheet metal bodywork of a vehicle and a decorative strip and/or protective strip mounted on that part of the sheet metal bodywork.

Of course, numerous other variants are possible according to circumstances, and in this connection it is to be noted that the invention is not limited to the examples described and shown.

The invention claimed is:

1. A fastening device for fastening a panel to a wall with a high resistance to pulling off, comprising a male member to engage on the panel at least indirectly and a female member to engage on the wall, the male member and the female member being configured for the female member to be able to receive and retain the male member releasably, characterized in that:
   in order for the female member to receive and retain the male member, the male member comprises a foot having a spike which narrows from a shoulder towards a distal end of the foot, while the female member comprises a cavity for reception of said spike and an elastic part extending across the cavity, which is configured to bend in contact with the spike, on a thrusting-in movement of the foot into the cavity, and to relax when the spike has passed beyond the elastic part in order to arrive opposite the shoulder to prevent the withdrawal of the spike from the cavity;
   to release the male member from the female member, the female member comprises an actuating part to dispose the elastic part clear of the shoulder of the foot, the actuating part projecting radially outwards from the female member;
   for the female member's engagement on the periphery of an aperture of the wall having a contour having two crenels facing each other and two circle arcs facing each other and each extending from one to the other of the crenels, the female member comprises, rearward of the actuating part, a butt configured to extend through the aperture, the butt having:
      an outside lateral surface having at least one first cylindrical portion and a second cylindrical portion diametrically opposite the first cylindrical portion,
      two bearing skids each jutting radially respectively from said first cylindrical portion and said second cylindrical portion of said outside lateral surface of the butt, each bearing skid having a contact surface for contact with the wall, wherein the contact surfaces contact the wall on the periphery of the aperture at a completion of an insertion of the butt through the aperture,
      two insertion fins each projecting radially respectively from said first cylindrical portion and from said second cylindrical portion of said outside lateral surface of the butt, each insertion fin being rearward of and aligned with a respective bearing skid, each insertion fin having, facing the contact surface of the corresponding bearing skid, a contact surface for contact with the wall each insertion fin having a contour set back from the contour of the corresponding bearing skid, and configured for insertion into the crenels of the aperture of the wall, wherein the insertion fins can only pass through the aperture if the insertion fins are angularly oriented like the crenels,
      at least one locking fin projecting radially from said outside lateral surface of the butt between the two insertion fins, having the same contour as one of the insertion fins, wherein at a completion of an insertion of the butt through the aperture, respective edges of the at least one locking fin come into contact against the wall, on the periphery of the aperture; and to index the angular position of the female member in relation to the wall, in order for the actuating part of the female member to be turned towards an outside edge of the wall, each insertion fin has a different contour from the contour of the other insertion fin.

2. A device according to claim 1, wherein said butt has two locking fins each projecting radially from said outside lateral surface, each said locking fin having the same contour as a respective one of said insertion fins.

3. A device according to claim 2, wherein the angular spacing between each locking fin and an adjacent one of said insertion fins having the same contour is a quarter turn.

4. A device according to claim 1, wherein said elastic part is an extractible pin, said actuating part of the female member being formed by a loop of said pin.

5. A device according to claim 4, wherein said pin comprises two legs linked to each other by said loop.

6. A device according to claim 5, wherein said pin is made of elastically flexible metal wire shaped by bending with said legs being disposed flanking each other.

7. A device according to claim 6, wherein each leg has an arcuate portion the inside radius of curvature of which corresponds to an inside diameter of said shoulder, each said arcuate portion being disposed in said cavity.

8. A device according to claim 1, wherein said female member comprises, in addition to said butt, a brim surrounding a mouth of said cavity.

9. A device according to claim 8, wherein said butt comprises a flange from which projects said brim.

10. A device according to claim 1, wherein said male member comprises:
 a clip comprising said foot and a head; and
 a sole provided to be engaged on said panel, said sole and said head being configured to be assembled with the head kept in a predetermined position relative to the sole with the exception of an elastic offset about said predetermined position.

11. A device according to claim 10, wherein said sole comprises a base in which is formed a cut-out while a rib surrounding said cut-out projects from a first face of said base; in that said head comprises a plate, a counter-plate and a spacer linking the plate to the counter-plate, the counter-plate comprising flexible peripheral arms; and in that in an assembled state of said sole and of said head, said spacer is disposed in said cut-out with the counter-plate facing said first face of said base with said flexible peripheral arms in contact with said rib while said plate faces a second face of said base, which is a reverse face to said first face.

12. A device according to claim 11, wherein said counter-plate comprises a rigid flange on the periphery of which are regularly spaced said flexible peripheral arms, which each comprise a first branch and a second branch with an elbow between the first branch and the second branch, the first branch extending between a zone of junction with the flange and the elbow, the second branch extending between the elbow and an appendix, which appendix extends towards a neighboring flexible peripheral arms with a free end of the appendix situated between the flange and the elbow of said neighboring flexible peripheral arms.

13. An assembly comprising a device according to claim 1, further comprising a wall, said wall comprising an aperture on the periphery of which is engaged the butt of said female member and a panel on which is engaged said male member, said actuating part of said female member being turned towards an outside edge of the wall.

14. An assembly according to claim 13, wherein the assembly further comprises a tool configured to act on said actuating part in order to dispose the elastic part clear of the shoulder of the foot, said female member and said foot being configured such that the foot can be thrust into said cavity until said panel bears against said wall and such that the foot is able to withdraw from the cavity to a position in which said shoulder is against said elastic part with said panel then being sufficiently spaced away from said wall for said tool to be inserted between said wall and said panel to come into engagement with said actuating part.

15. An assembly according to claim 13, wherein said wall is an inside metal sheet of an automotive vehicle door whereas said panel is an inside trim panel of said door.

16. A device according to claim 1, wherein arms extend from the panel, which arms enable the at least indirect engagement of the male member with the panel.

17. A device according to claim 1, wherein arms extend from the panel, wherein the at least indirect engagement of the male member with the panel is enabled via the arms that extend from the panel, wherein the arms are directly connected to a sole, wherein the sole is directly connected to the male member.

18. An assembly comprising a device according to claim 1 and a panel and a wall, wherein arms extend from the panel, wherein a sole is directly attached to the arms, wherein the male member is directly connected to the sole, and the female member is directly connected to the wall, and thus the panel is indirectly connected to the wall.

* * * * *